Figure 1:
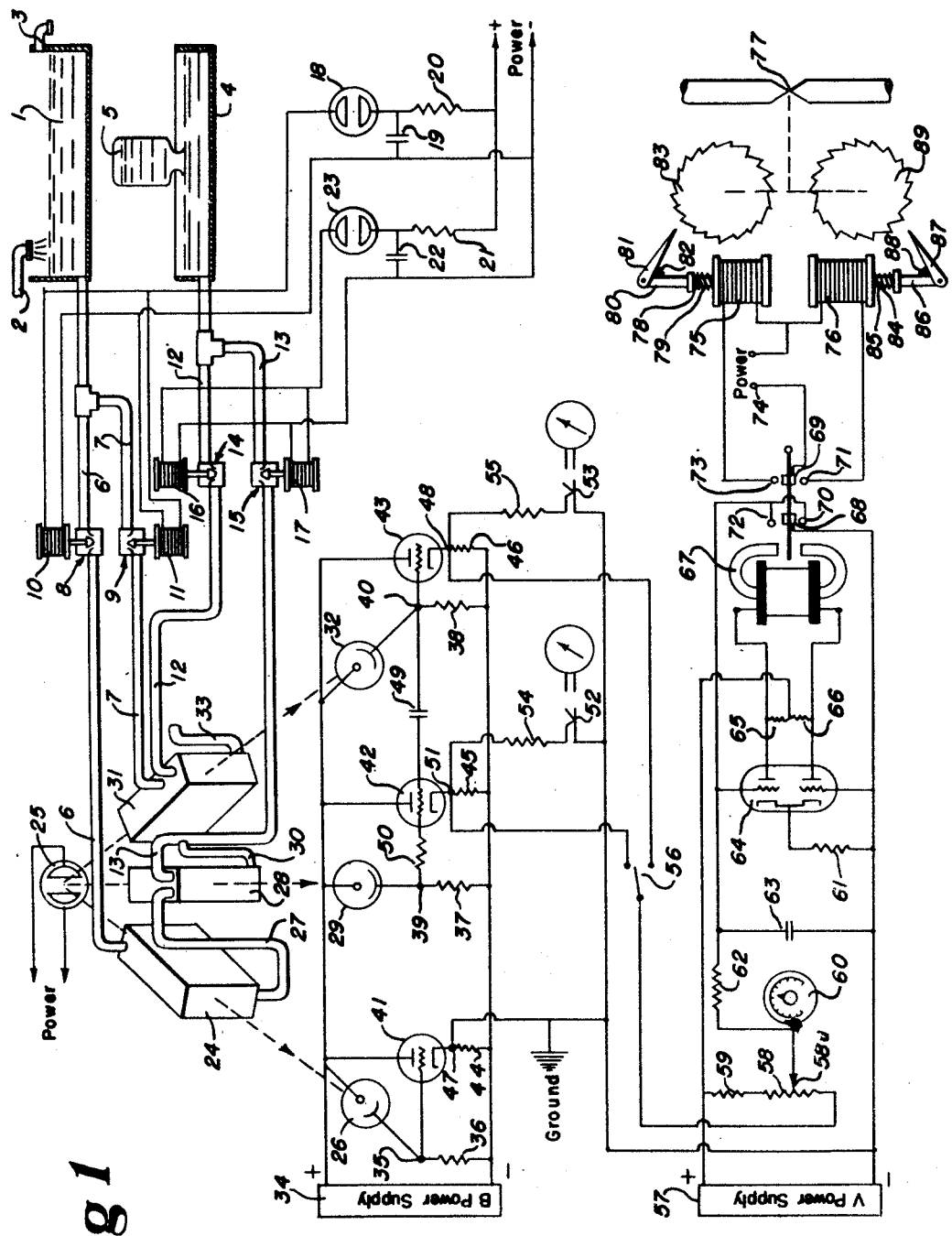

Oct. 17, 1950          H. A. STEIN          2,526,515
METHOD AND MEANS FOR MEASURING AND CONTROLLING
CHLORINE CONTENT OF WATER
Filed June 3, 1947          3 Sheets—Sheet 1

Inventor
H. A. Stein

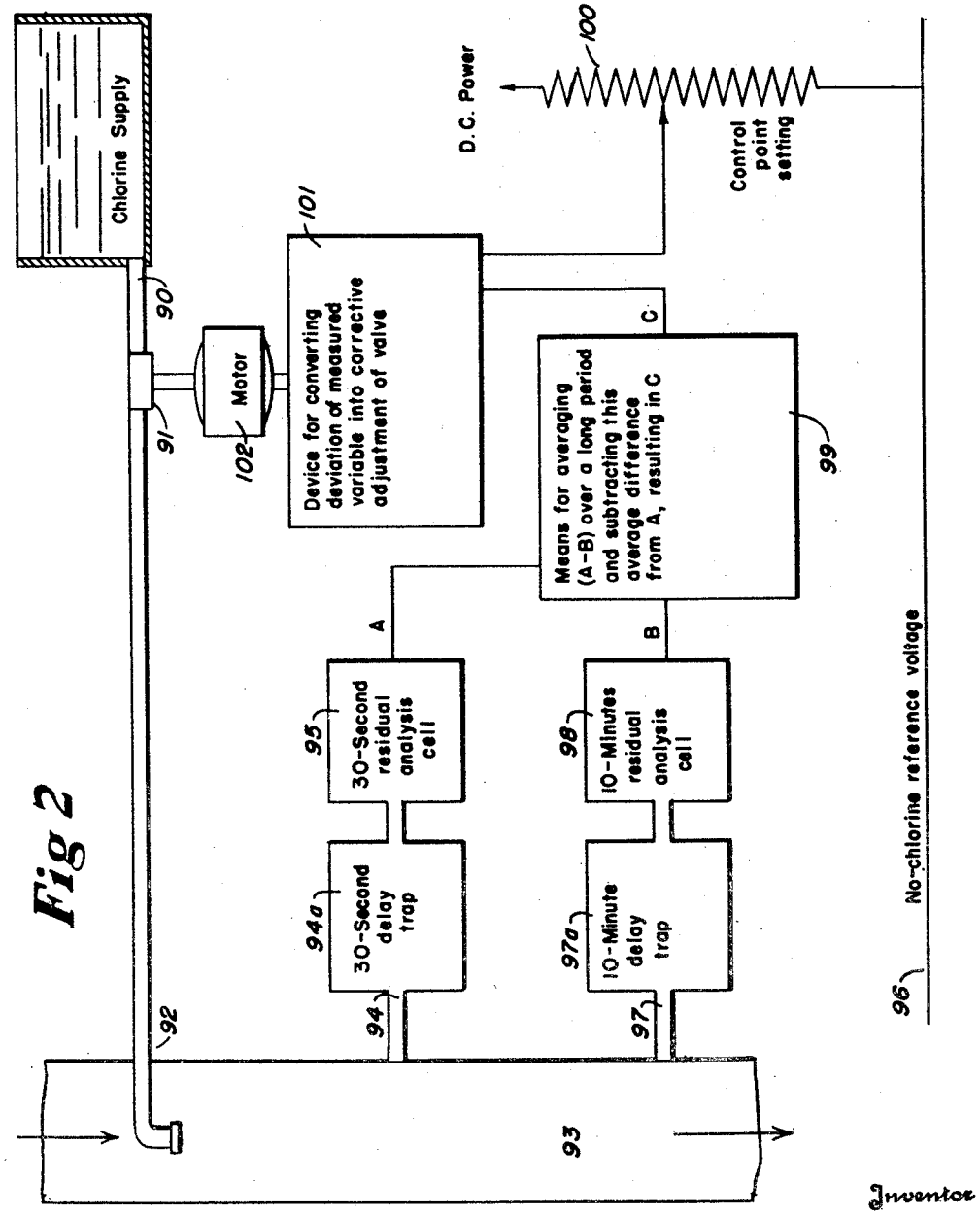

Oct. 17, 1950     H. A. STEIN     2,526,515
METHOD AND MEANS FOR MEASURING AND CONTROLLING
CHLORINE CONTENT OF WATER

Filed June 3, 1947     3 Sheets-Sheet 3

Inventor

H. A. Stein

By Ben. J. Chromy
Attorney

Patented Oct. 17, 1950

2,526,515

UNITED STATES PATENT OFFICE 2,526,515

METHOD AND MEANS FOR MEASURING AND CONTROLLING CHLORINE CONTENT OF WATER

Herbert A. Stein, St. Albans, N. Y.

Application June 3, 1947, Serial No. 752,090

9 Claims. (Cl. 210—28)

This invention relates to apparatus for, and a method of, measuring, recording, and controlling the amount of a reagent fed into a substance, and also the amount of the reagent remaining uncombined at a specific time after addition of such reagent. More specifically, this invention pertains to apparatus for, and a method of, measuring, recording and controlling the amount of chlorine fed into water, and the amount of residual chlorine remaining in the water at a specified time after chlorination.

This application is a continuation in part of my application Serial No. 699,568, filed September 26, 1946, now abandoned.

In place of pure liquid or gaseous chlorine, certain other substances containing and capable of releasing free chlorine may be used, and in what follows below, the word chlorine may be used to designate either pure chlorine or the free chlorine provided by such chlorine compounds.

When chlorine is mixed with water containing organic impurities, a chemical reaction occurs which results in the removal of the organic matter leaving the water purified and fit for consumption. Simultaneously, some of the chlorine is consumed in the reaction. The amount of chlorine fed into the water, i. e., feed chlorine, minus the residual chlorine, defined as the amount of chlorine remaining in the water after a specified time, usually 10 to 15 minutes, is known as the chlorine demand. Chlorine demand is a characteristic of the particular water undergoing treatment, and is roughly proportional to the amount of organic impurities present in the water.

In the customary procedure for introducing chlorine into water supplies, a fixed rate of chlorine feed is maintained, but unless the chlorine demand is known and taken into consideration, there may result a lack or excess of residual chlorine. If there is a lack of residual chlorine, then the water may still be contaminated with organic matter or may become contaminated en route to the consumer. If there is an excess of residual chlorine, then the water will be unpalatable, objectionable and not fit for certain uses. A value of .1 to .5 P. P. M. (parts per million by weight) is considered satisfactory for municipal water supplies, the exact value used being dependent upon local conditions.

Because of the need for taking chlorine demand into consideration in setting the various types of fixed flow or proportioning chlorinators, it is customary to make analyses of the water from time to time to ascertain the chlorine demand. Then if, for example, a residual chlorine content of .3 part per million is desired, and the chlorine demand is found to be 1.2 parts per million, the chlorinator is set so as to deliver 1.5 parts per million. Since the analyses of the water for chlorine demand require the services of a chemist, the procedure is tedious and costly, and since the analyses are made only periodically, continuous control of the residual chlorine content of the water is not obtained.

The purpose of the device and method to which this invention relates is to provide a means whereby the residual chlorine content may be measured, recorded, and maintained at a pre-set value by detecting deviations from the desired value and either opening or closing the chlorine supply valve to correct for the deviations. This is accomplished continuously and without human intervention, except perhaps for periodic cleaning and adjustment of the unit, and replenishing the supply of indicator reagent.

An object of this invention is to provide an apparatus for and a method of measuring, recording and/or controlling the amount of a reagent fed into a substance and also the amount of the reagent remaining uncombined at a specific time after addition of such reagent.

Another object of this invention is to provide a means whereby, on the basis of several continuous readings of residual chlorine taken at various times after chlorination, the residual chlorine content of the water a long time after chlorination may be controlled.

Still another object of this device is to provide a means for subtracting from an early reading of residual chlorine content the previously established average difference between an early and a late reading, to predict in a short time the amount of residual chlorine content which would have been found present if the sample had been left a longer time between chlorination and analysis.

A still further object of this device is to provide a means for detecting small amounts of residual chlorine in water and to produce thereby a large voltage proportional to the residual chlorine content, so as to make possible the control of residual chlorine content by manipulating motor-driven valves or porportioning devices.

Figure 4:
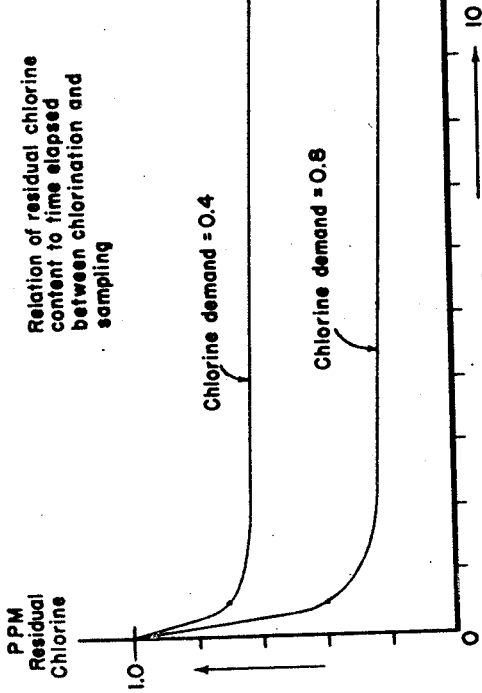
Figure 5:
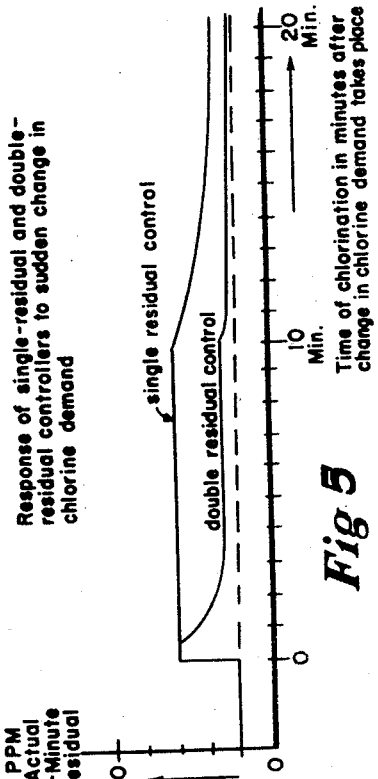
Figure 3:
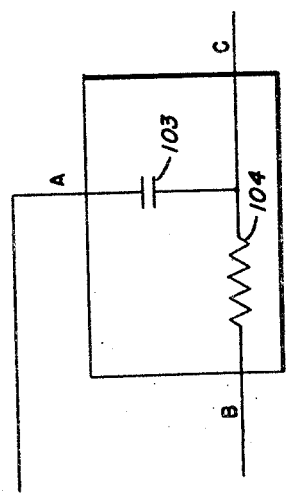
Figure 3A:
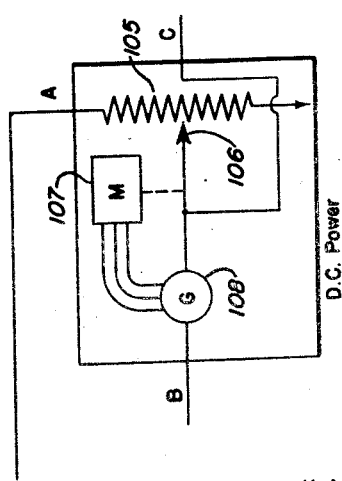

Other objects of this invention will be apparent from the following specification and claims, and the drawings which form a part of this application. Figure 1 is a schematic wiring diagram of apparatus employed in accordance with this invention. Here Figure 2 is a block diagram of the process devoid of the detail shown in Figure 1. Figure 3 represents schematically a device for producing the predicted 10-minute residual voltage fed to line C of Figure 2. Figure 3a is an alternative device for that shown in Figure 3. Figure 4 consists of graphs showing the relation between two different types of residual chlorine content for two water samples having different chlorine demand. Figure 5 is a graph illustrating the advantage of this invention over prior art methods in providing greater speed of recovery of the controller after a sudden change in chlorine demand.

In the device for accomplishing this control, a vessel 1 is provided with some suitable means for constantly supplying it with water which has just been chlorinated. One such means is through a small pipe 2 leading from the main chlorinated water pipe, the small pipe 2 being of such a size that enough water passes through it to insure a fresh supply of water in the vessel 1. An overflow 3 can be utilized to return the unused water to the main pipe if desired.

Another vessel 4 is equipped with some suitable means for replenishing the supply of the indicator reagent, starch iodide solution. One possible method is by an inverted bottle 5 which allows air to enter and indicator to leave it when the level of the indicator in the vessel 4 falls below the mouth of the bottle 5.

Controlling the passage of water through the two tubes 6 and 7 leading from the water vessel 1 are two valves 8 and 9 operated by solenoids 10 and 11 in such a manner that when current is flowing through the solenoids, the valves are open, and when the current ceases to flow, the valves are closed. The passage of the indicator from the indicator vessel 4 through the two tubes 12 and 13 is likewise controlled by valves 14 and 15 similarly equipped with solenoids 16 and 17.

The valves 8, 9, 14 and 15 are to be opened from time to time by some suitable means so that a substantially constant supply of water and indicator are passed through them. This method is used in preference to using manually pre-set valves because the latter would clog up in time and necessitate more frequent cleaning or readjustment. However, for the purposes of this device it is not absolutely necessary to use the method of periodic opening of the valves, nor is it absolutely necessary to employ the system described here to bring about such periodic opening.

The solenoids 10 and 11 are connected in series with a gas diode 18 and this combination is connected across a capacitor 19 which is fed with current from a power supply through a resistor 20. The value of this resistor 20 is adjusted in such a manner that the rate of charge of the capacitor 19 is of such value as to bring about the desired frequency of ionization of, and consequent discharge through, the gas diode 18 and through the solenoids 10 and 11. The frequency of opening of the valves 8 and 9 can therefore be controlled by manipulating the value of the resistor 20.

The flow of indicator reagent is likewise controlled by manipulating the value of the resistor 21, which in the same manner feeds the capacitor 22 which discharges through the gas diode 23 and the solenoids 16 and 17. Therefore, by adjusting the relative values of the resistors 20 and 21, it is possible to control the relative amounts of water and indicator which flow through the pipes 6, 7, 12 and 13. Of course, this method will require a very small amount of indicator in relation to the amount of water to be tested.

The water which flows through one pipe 6 drops into a vessel 24 made of some transparent material. The vessel is so aligned that its length is in line with a suitable light source, such as a neon glow lamp 25, and a photoelectric tube 26. The neon lamp 25, vessel 24, and photoelectric tube 26 are so placed in relation to each other that the light from the neon lamp 25 passes through the liquid in the vessel 24 and reaches the light-sensitive portion of the photoelectric tube 26. The neon lamp is connected to any suitable source of current, either A. C. or D. C.

The vessel 24 is equipped with a tube 27 leading from the bottom of the vessel 24 and leading to the top of another vessel 28 in such a manner that each drop of water falling into the top of the first vessel 24 displaces another drop of water from the bottom of the vessel 24 through the tube 27 and into the top of the second vessel 28. The second vessel 28 is also constructed of transparent material.

Also leading to the top of the second vessel is a tube 13 through which the periodic drops of indicator reagent pass from the main vessel 4 through the valve 15. These drops of indicator become mixed with the incoming drops of water in the top part of the vessel 28, the mixture traveling downward through the path of the light from the same neon lamp 25 mentioned previously. This light reaches a second photoelectric tube 29 placed similarly with respect to the second vessel 28 as the first photoelectric tube 26 was placed with respect to the first vessel 24.

The vessel 28 is provided with a tube 30 leading from the bottom of the vessel 28 and extending upward to just slightly below the level of the top of the vessel 28 so that when a drop of liquid enters the top, another drop is displaced from the bottom through the tube 30 and upward out to a waste drain, if desired.

A third transparent vessel 31 is so placed that light from the same neon lamp 25 passes through it lengthwise and reaches a third photoelectric tube 32. This vessel 31 is fed with water at the same rate that the first vessel 24 was fed, the drops passing through a valve 9 and a tube 7. Indicator is also fed into the vessel 31 through a valve 14 and a tube 12. The efflux from the third vessel 31 is disposed of in the same manner as the efflux from the second vessel, through an overflow tube 33 leading from the bottom of the vessel 31.

In the hydraulic system described above, the first vessel 24 acts as a trap to detain the chlorinated water for a sufficient amount of time for the reaction between the chlorine and the organic impurities to take place. This time would correspond to the time specified in the definition of residual chlorine given at the beginning of this specification. In this manner, the chlorine content of the water which enters the second vessel 28 will be the residual chlorine content resulting 10 minutes after chlorination. The third vessel 31 is fed directly with water from the fresh water reservoir 1 and therefore the chlorine content of the water entering the third vessel 31 is approximately equal to the amount of chlorine remaining 30 seconds after chlorination.

When starch iodide solution, the indicator reagent referred to above, is added to water containing no chlorine at all, no noticeable change in color occurs, since the indicator is completely colorless and only slightly turbid, and since only a very small amount of indicator is needed. But when chlorine is present in the water treated with the indicator, a blue color appears. The relation between the intensity of this blue color and the chlorine concentration is linear within the range of concentrations dealt with in the treatment of water supplies. That is, a certain increment of concentration produces the same increment of intensity of color throughout the range of concentrations to be dealt with. These variations in color density are not very closely distinguishable to the human eye. For this reason, the starch iodide test is not often used for sensitive colorimetric analysis depending on the human eye alone. But when essentially monochromatic light of the red end of the spectrum is used in conjunction with a photoelectric tube sensitive principally to the red end of the spectrum, small variations in the blue color intensity show up as measurable changes in the resistance of the photoelectric tube.

Light passing through the vessel 24 containing clear water reaches the photoelectric tube 26 and allows it to conduct electricity from the B power supply 34 at such a rate as to establish a voltage at a point 35 between it and a series load resistor 36. This voltage may be called the no-chlorine voltage. If there were neither 10-minute residual chlorine content nor 30-second residual chlorine content, the same amount of current would be conducted by the other two photoelectric tubes 29 and 32 connected similarly with their respective load resistors 37 and 38 of equal value to the first load resistor 36. Hence, the voltages at the points 39 and 40 connected to the cathodes of the photoelectric tubes 29 and 32 will be equal to the no-chlorine voltage at the point 35 connected to the cathode of the first photoelectric tube 26.

But if either 30-second residual chlorine or 10-minute residual chlorine is present, the voltages at the cathodes of the respective phototubes will differ negatively from the no-chlorine voltage by amounts directly proportional to the amounts of chlorine contained in each case.

Summing up, the mechanisms described thus far have converted the 30-second residual and the 10-minute residual into voltage differences with respect to the cathode of the no-chlorine photoelectric tube. If photoelectric cells giving large amounts of current were available, it would be possible to measure these voltages directly by means of voltmeters connected between the cathode of the no-chlorine photoelectric tube and the respective cathodes of the 10-minute residual chlorine photoelectric tube 29 and the 30-second residual photoelectric tube 32. The readings on these two voltmeters would then bear direct relation to the amounts of 10-minute residual chlorine and 30-second residual chlorine, respectively.

But since most common voltmeters require larger amounts of current than most common photoelectric tubes conduct, it is preferable to employ some means of reproducing the desired voltages at other points, across less resistance and hence employing larger currents. Such a method is the cathode follower circuit, consisting of a vacuum triode whose plate is connected to a positive power supply, whose grid is connected to the voltage to be reproduced, and whose cathode is connected to a resistor which in turn is connected to the negative pole of the power supply. By this means, the voltage appearing at the cathode is almost the same as the voltage applied at the grid.

Three such cathode followers are employed, consisting of three triodes 41, 42 and 43 and three cathode resistors 44, 45 and 46. The first cathode follower consisting of a triode 41 and a resistor 44 reproduces the no-chlorine voltage from the point 35 at point 47. The third cathode follower consisting of a triode 43 and a resistor 46 reproduces the 30-second residual chlorine voltage from point 40 at point 48.

The potential at point 47, the cathode of the no-chlorine cathode follower triode 41 will be called ground, and will serve as a reference for all voltages discussed in the remainder of this specification unless otherwise specified.

Instead of employing exactly the voltage resulting from the analysis of 10-minute residual chlorine by means of the second photoelectric tube 29, this device measures the 10-minute residual by subtracting a voltage proportional to the 30-second to 10-minute component of chlorine demand from the voltage proportional to the 30-second residual chlorine. Since the 10-minute residual chlorine analysis requires ten minutes to be performed, variations in the 10-minute residual chlorine due to changes in the feed chlorine or the chlorine demand could not be detected rapidly enough to correct for them in time. The 30-second to 10-minute component of chlorine demand does not vary as rapidly as the feed chlorine or the 0 to 30 second component of chlorine demand so it is possible to obtain a good approximation of 10-minute residual chlorine in a short time by subtracting from the 30-second residual an average of the 30-second to 10-minute component of chlorine demand over some time longer than ten minutes.

This is accomplished by connecting the grid 30-second residual cathode follower triode 43 and the grid of the 10-minute residual cathode follower triode 42 by a capacitor 49 of large value and isolating the grid of the 10-minute residual cathode follower triode 42 from the cathode of the respective photoelectric tube 29 by means of a resistor 50 of large value. This capacitor-resistor combination is known as a long time-constant circuit and serves to produce across the capacitor 49 a long-time average difference between the voltages on the cathodes of the 10-minute residual chlorine photoelectric tube 29 and the 30-second residual chlorine photoelectric tube 32. By having this capacitor 49 connected from the cathode of the 30-second residual photoelectric tube 32 to the grid of the 10-minute residual chlorine cathode follower triode 42, a voltage representing the average 30-second to 10-minute component of chlorine demand of the water is subtracted from a voltage representing the 30-second residual producing on the grid of the 10-minute residual, chlorine cathode follower triode 42 a voltage approximating what the residual chlorine content would be if the water were actually left 10 minutes before analysis.

This voltage is then reproduced at the cathode of the 10-minute residual chlorine cathode follower triode 42 or point 51.

In order to measure and record the 10-minute residual and the 30-second residual chlorine, jacks 52 and 53 are provided for the insertion of ordinary milliammeters or recording milliammeters, calibrated in parts per million. These jacks 52 and 53 are connected in series with dropping resistors 54 and 55 of suitable value and connected between ground—the cathode of the no-chlorine cathode follower triode 41—and the cathodes of the 10-minute residual and the 30-second residual cathode follower triodes 42 and 43.

Also leading from the cathodes of the triodes 42 and 43 are two wires connected to the opposite contacts of a double-pole single-throw switch 56 by means of which either 10-minute residual chlorine or 30-second residual chlorine is selected as the factor to be controlled.

The negative pole of another power supply, the V power supply 57, is connected to ground— the cathode of the no-chlorine cathode follower triode 41. This power supply is not electrically connected to the B power supply 34 in any other way except through that connection to the cathode of the triode 41.

The switch 56 by means of which either 30-second residual or 10-minute residual chlorine is selected for controlling, leads to a potentiometer 58 in series with another resistor 59 which is connected to the positive pole of the V power supply 57. The potentiometer 58 is provided with a sliding arm 58a and a pointer 60 attached to the arm. The pointer 60 travels over a scale which is calibrated in parts per million. The value of the resistor 59 is adjusted so that when the potentiometer pointer points to, for example, one part per million, the voltage between the switch end of the potentiometer 58 and the sliding arm is equal to the voltage which would be produced at the cathode of triode 42 or 43 by one part per million of chlorine.

If, for example, one part per million of chlorine is desired, the knob 60 of the potentiometer 58 is set for one part per million. If one part per million of chlorine is present, then the sliding arm will be at ground potential. If there is insufficient chlorine, it will be above ground potential, and if there is excessive chlorine it will be below ground potential.

In the part of the device to be described below, this deviation from the desired chlorine content will be amplified and converted into a valve movement in the correct direction and at a rate proportional to the magnitude of the deviation.

The sliding arm 58a of the potentiometer 58 is connected to a resistor 62 and then to a capacitor 63 which is connected to ground. The resistor end of the capacitor 63 is connected to the upper grid of a duo-triode 64 and the lower grid of the duo-triode 64 is connected to ground. A resistor 61 is employed to provide grid bias for both sections of the duo-triode 64, that is, to keep the grids negative with respect to the cathode.

When no deviation exists, the capacitor 63 and the resistor 62 have no voltage across them, both ends being at ground potential. Therefore, the upper grid is also at ground potential, so the two sections of the duo-triode 64 conduct current equally through two equal plate load resistors 65 and 66, which are both connected to the positive pole of the V power supply 57. The plates of the two sections of the duo-triode 64 are therefore at equal potentials when no deviation exists.

But when a positive voltage appears on the sliding arm of the potentiometer 58, indicating a lack of chlorine, the capacitor 63 charges through the resistor 62 to make the upper grid of the duo-triode 64 more positive than the lower grid. Therefore, more current flows through the upper section giving a greater voltage drop across the upper load resistor 65. This makes the upper plate more negative than the lower plate.

When a negative voltage appears on the sliding arm of the potentiometer 58 indicating an excess of chlorine, the capacitor 63 charges through the resistor 62 to make the upper grid of the duo-triode 64 more negative than the lower grid. Therefore, less current flows through the upper section, giving a smaller voltage drop across the upper load resistor 65. This makes the upper plate more positive than the lower plate.

Furthermore, the duo-triode 64 amplifies the voltage differences applied to the upper grid, so that a small difference between the upper and lower grids shows up as a large difference between the upper and lower plates, only the voltage difference is of opposite direction, as explained above.

The plates of the duo-triode 64 are connected to the coil terminals of a double-pole double-throw polarized relay 67 of high sensitivity, or any electronic or electro-mechanical combination capable of performing the same function. When a positive voltage is applied to the upper terminal with respect to the lower terminal, the moving contacts 68 and 69 move downward and touch the lower fixed contacts 70 and 71. When a negative voltage is applied to the upper terminal with respect to the lower terminal, the moving contacts 68 and 69 move upward and touch the upper fixed contacts 72 and 73. One moving contact 68 is connected to ground and the upper and lower fixed contacts 70 and 72 opposite it are both connected to the upper grid of the duo-triode 64. The other moving contact 69 is connected to one side of a power source 74, either A. C. or D. C., and the upper and lower fixed contacts 71 and 73 are connected to some means for translating electrical impulses into motion, such as the solenoids 75 and 76, whose other ends are connected to the other terminal of the power source 74 referred to above.

As previously explained, when exactly the desired amount of chlorine is present, the plates of the duo-triode 64 are at the same potential. No voltage appears across the terminals of the relay 67 and the moving contacts 68 and 69 remain free of the lower and upper fixed contacts 70, 71, 72 and 73. No current is supplied to the solenoids 75 and 76 and therefore the mechanism operated by the solenoids to open and close the chlorine supply valve 77 remains still.

But an excess of chlorine causes a positive voltage on the upper plate of the duo-triode 64 with respect to the lower plate and hence causes the moving contacts 68 and 69 of the relay 67 to move downward and touch the lower fixed contacts 70 and 71. One moving contact 69 touching the corresponding lower fixed contact 71 causes the lower solenoid 76 to operate a mechanical arrangement to close the chlorine supply valve 77 a certain amount. At the same time the other moving contact 68 touches the other lower fixed contact 70 grounding the upper grid of the duo-triode 64 and discharging the capacitor 63. The moving contacts 68 and 69 of the relay 67 then return to the neutral position until the capacitor 63 charges up again through the resistor 62 when the process is repeated and the solenoid 76 again closes the chlorine supply valve 77 a certain additional amount. The upper fixed contacts 72 and 73 are touched intermittently in a similar manner to operate the other solenoid 75 to open the valve when too little chlorine is detected. When the deviations are large, the capacitor 63 charges up more rapidly through the resistor 62 than when the deviations are small, and therefore the frequency of operation of the solenoids 75 and 76 is greater. In this way, not only does the device correct rapidly for large errors in the setting of the chlorine supply valve, but also the rate of correction is decreased when the deviation becomes very small, thereby preventing overcorrection which would cause the chlorine content to vary from one side of the desired value to the other even after the cause of the deviation had been corrected.

Although any suitable devices to convert electric current into mechanical motion may be employed in place of the solenoid 75 and 76 pictured here, these solenoids are suggested as one possible means of opening or closing the chlorine supply valve 77.

The solenoid 75 is provided with a plunger 78 kept partly outside of the coil by a spring 79. The plunger is fitted with a shaft 80 rigidly attached to it, oblique to which is pivoted an arm 81, flexibly held at an angle to the shaft 80 by a spring 82. When no current is flowing through the solenoid 75 the arm 81 is completely free of the ratchet wheel 83. But when the solenoid is actuated due to the operation of the relay 67 the plunger 75 enters the coil, causing the arm 81 to engage a tooth of the ratchet wheel 83 and move it counter-clockwise. The first spring 79 restores the plunger 75 and arm 81 to their original positions when current no longer flows.

The other solenoid 76 is similarly equipped with a plunger 84, spring 85, shaft 86, arm 87, spring 88 and ratchet wheel 89. The ratchet wheel 89 moves in a clockwise direction each time current flows in the lower solenoid 76.

The two ratchet wheels 83 and 89 are connected to the same shaft and this shaft adjusts the stem of the chlorine supply valve 77 either directly or by means of suitable gearing arrangements not shown here.

The chlorine supply valve 77 should preferably be of a type which gives an increase in flow for a given change in lift proportional to the rate of flow before the change was made. With this type of valve, the speed of correction of errors in the chlorine flow is the same no matter how large or small the amount of flow may be. Such a valve, however, is not absolutely necessary to the operation of the device.

The triodes used in this device are heated by filiaments connected to a source of current not shown in the drawing.

Most of the components included in this device are purchasable on the open market. Such purchasable items include the starch iodide solution, solenoid valves, neon lamps, photoelectric tubes, triodes, duo-triodes, gas diodes, power supplies, resistors, condensers, potentiometers, milliameters, recording milliameters, jacks, switches, polarized relays, solenoids and chlorine supply valves.

A more general embodiment of this invention is shown in Figure 2, which represents the main features of the process without the specific details shown in Figure 1. The 30-second delay trap 94a in Figure 2 corresponds to the vessel 1 and the pipe 7 in Figure 1. Similarly, the 30-second residual analysis cell 95 corresponds to the vessel 31, the photoelectric cell 32, the load resistor 38, the triode 43, and the load resistor 46; the 10-minute delay trap 97a is equivalent to the vessel 1, the pipe 6, and the vessel 24; and the 10-minute residual analysis cell 98 corresponds to the vessel 28, the photoelectric cell 29, the load resistor 37, the triode 42, and the load resistor 45. The no-chlorine reference voltage 96 is produced by the vessel 24, the photoelectric cell 26, the load resistor 36, the triode 41 and the load resistor 44. The averaging means 99 comprises the capacitor 49 and the resistor 50; and the control point setting 100 corresponds to the potentiometer 58, the sliding arm 58a, and the pointer 60. The deviation-sensitive mechanism 101 comprises the triode 64, the resistors 61, 65, and 66; and the polarized relay 67; the motor 102 is analogous to the solenoids 75 and 76 with their related appurtenances 78 through 89; and the valve 91 corresponds to the valve 77.

Chlorinating agent is supplied through a pipe 90, its flow, or the proportional flow of chlorine with respect to water being treated, being controlled by a valve 91 or other flow-manipulating or proportioning device. The chlorine is combined with the water under treatment at point 92, and the mixture is fed to the consumer through a pipe 93. Branching off from this pipe 93 are two sampling taps 94 and 97, whereby small amounts of the chlorinated water are continuously diverted into analysis units. One sample is held for thirty seconds in the 30-second delay trap 94 and fed to the 30-second residual analysis cell 95, where this residual is converted into a voltage A with respect to the no-chlorine reference voltage and proportional to the 30-second residual. Similarly, a second continuous sample taken through a tap 97 is delayed for ten minutes in a trap 97a before entering the 10-minute residual analysis cell 98, which produces a voltage B proportional to the 10-minute residual. Instead of controlling the flow or proportion of chlorine to water directly on the basis of the 10-minute residual, it is desirable to estimate or predict in 30-seconds the 10-minute residual which would be found if the water had been left for 10 minutes after chlorination, for the reaction to be completed. Those skilled in the art of automatic control will readily appreciate that an automatic control system which involves a measurement lag of ten minutes will have to have extremely sluggish recovery in order to prevent cycling. Therefore, this invention provides for a means 99 for averaging over a long period of time, 20 minutes for example, the difference between the 30-second residual and the 10-minute residual, also called the 30-second to 10-minute component of chlorine demand. This average difference is subtracted from voltage A resulting in voltage C, the predicted 10-minute residual.

This residual is compared with the desired 10-minute residual set up on the control point setting potentiometer 100. The difference between these two values is transmitted to a device 101 for converting this deviation into some form of electrical voltages or impulses which will cause the motor 102 to move the valve 91, or other flow-adjusted or proportioning means, in the proper direction and at the appropriate rate, to correct for the detected deviation most efficiently. This may be done by employing any combination of three possible modes of control, proportional-position, reset or rate response. These terms are discussed at length in Principles of Industrial Process Control, by D. P. Eckman, John Wiley and Sons, New York, 1945, in chapter 4, pages 57–79. A description of these modes of control may also be found in the report by the editors of the magazine Chemical and Metallurgical Engineering on "Measurement and Control of Process Variables," May 1943, on pages 102-107 and 123-124.

In place of the potentiometer 100, deviation device 101 and motor 102, it is possible to employ pneumatic means for manipulating the valve 91, without changing the efficiency or purpose of the invention. These air-operated controllers are readily obtainable on the open market.

Figures 3 and 3a show in greater detail two means for producing the predicted 10-minute residual voltage C in Figure 2. The first, which is the one used in the detailed apparatus in Figure 1, employs a capacitor 103 and a resistor 104. The time constant of this R.-C. circuit is so long that the capacitor 103 will retain across itself a voltage representing the average difference over a long period between voltages A and B. Since voltage A is greater than B, the voltage at point C will be equal to the instantaneous voltage at A minus the average difference of A and B over a long period of time.

The other method involves a self-balancing potentiometer. The potentiometer 105 has a contact 106 which is caused to move up and down the slide wire by a motor 107 and a galvanometer relay 108 connected between the input voltage B and the moving contact. The relay 108 operates in such a manner that when a difference of potential exists between B and the moving contact 106, the motor 107 will tend to move the contact 106 in the proper direction to correct for the deviation and produce at B the same voltage with respect to A as is on the contact 106. However, a very slow motor is used, thereby retaining across the portion of the slide wire between A and the contact 106 a long term average difference between A and B. Once again, the difference between the momentary value of A and the average difference of A and B is obtained at point C, connected to the sliding contact 106.

Figure 4 illustrates a typical relation between feed chlorine, 30-second residual and 10-minute residual in the chlorination of two batches of water having different chlorine demand conditions. In each case, the feed chlorine is 1.0 P. P. M. In the lower curve, the demand is .8 P. P. M., and hence the residual at the end of 10 minutes is .2 P. P. M. The 30-second residual is .4, showing that in this case the 0 to 30-second component of the chlorine demand is .6, or 75% of the total chlorine demand. In the upper case, the chlorine demand is .4, the 30-second residual is .7, and the 10-minute residual is .6. Here, the 0 to 30-second component of the chlorine demand is again 75% of the total chlorine demand, or .3 P. P. M.

Figure 5 shows the response of a double-residual controller (such as described in this specification) to the change in water condition from the lower curve in Figure 4 to the upper curve, as compared with the response of the known single-residual controller. The actual 10-minute residual is plotted against the time of chlorination in minutes after the change in demand takes place. The upper curve illustrates the fact that a single-residual controller is unable to act to correct for a change in chlorine demand until 10 minutes after the change takes place, and even then the corrective action of the valve motor in changing the valve setting must take place very slowly because the results of any corrective action cannot be checked during the 10-minute measurement lag period.

However, in the case of the double-residual controller, referring to Figure 2 and Figure 3, the average 30-second to 10-minute component of the chlorine demand is represented as a voltage across the capacitor 103, due to the averaging action of the long time-constant circuit composed of a capacitor 103 and a resistor 104. For convenience, it is assumed that the measuring unit produces 1 volt per part per million so that parts per million and volts representing them will be numerically equal. Hence the voltage across the capacitor 103 is .2 before the change in demand takes place.

When the demand decreases from .8 to .4 P. P. M. the 30-second residual will rise .3 volt or 75% of the change in total chlorine demand, the new value of 30-second residual being .7 P. P. M. This voltage appears at A. The predicted residual will be .7 minus .2, the voltage across the capacitor, or .5 P. P. M. The voltage at C will then be .5 volt. Since the control point is .2 P. P. M., the motor operated by the deviation-sensitive mechanism will close the valve 91 until only .7 P. P. M. are fed into the water. This will produce a voltage of .4 at A and .2 at C, even though the actual 10-minute residual would be .3 P. P. M., or .1 above the control point. This error of .1 in the 10-minute residual is detected 10 minutes after the change takes place. The resulting rise in the voltage at B from .2 to .3 is transmitted slowly to point C as the capacitor 103 discharges through the resistor 104. But each time a rise above the control point of .2 is detected at C, the valve is closed a small amount so that the voltage at A minus the now smaller voltage across the capacitor 103 will tend to remain at .2. This action ceases when the capacitor 103 is discharged to the new correct value of .1 as the 30-second to 10-minute component of chlorine demand. At this time, the feed chlorine will be .6 P. P. M., the 30-second residual will be .3, and the 10-minute residual will be .2.

In all the foregoing discussion, the terms 30-second and 10-minute have been used for examples only, to represent short time and long time residuals. It should be understood that it is not intended to limit the scope of the patent to residuals taken at such times, since the use of different periods in no way effects the validity of the procedure described herein.

While I have described an embodiment of this invention in detail, it is of course not desired to limit this invention to the exact details described and illustrated except insofar as they may be defined by the following claims.

What I claim is:

1. In an apparatus for manipulating the amount of a chemical reagent fed into another substance on the basis of the amount remaining uncombined after a certain period of time: the combination of means for producing a voltage proportional to the amount of the reagent remaining a short time after its addition, means for producing a voltage proportional to the amount of the reagent remaining a longer time after its addition, means for establishing the average difference, over a period of time, between the earlier content and the later content, means for subtracting a voltage representing said average difference between the two readings from the first mentioned voltage representing the amount of the reagent remaining a short time after its addition, whereby to produce in a short time a voltage approximately proportional to the amount of the reagent which would have been found present if the sample to which the first mentioned voltage refers had been retained for the longer period of time, and means for employing the last mentioned voltage for manipulating the amount of the reagent fed into the aforementioned substance.

2. In an apparatus for controlling the residual chlorine content of water: the combination of means for producing a voltage proportional to the residual chlorine content a short time after chlorination, means for producing a voltage proportional to the residual chlorine content a longer time after chlorination, means for establishing the average difference, over a period of time, between the earlier residual and later residual, means for subtracting a voltage representing said average difference between the two readings from the first mentioned voltage representing the residual chlorine content a short time after chlorination, whereby to produce in a short time after chlorination a voltage approximately proportional to the residual chlorine content which would have been found present if the sample to which the first mentioned voltage refers had been retained for the longer period of time between chlorination and analysis, and means for employing the last mentioned voltage for manipulating the amount of chlorine fed into the water.

3. In an apparatus for controlling the residual chlorine content of water: the combination of means for producing a voltage proportional to the residual chlorine content a short time after chlorination, means for producing a voltage proportional to the residual chlorine content a longer time after chlorination, a long time constant circuit connected between the two above mentioned means, for establishing the average difference, over a period of time, between the earlier residual and the later residual and subtracting the voltage representing said average difference between the two readings from the first mentioned voltage representing the residual chlorine content a short time after chlorination, whereby to produce in a short time after chlorination a voltage approximately proportional to the residual chlorine content which would have been found present if the sample to which the first mentioned voltage refers had been retained for the longer period of time between chlorination and analysis, and means for employing the last mentioned voltage for manipulating the amount of chlorine fed into the water.

4. In an apparatus for controlling the residual chlorine content of water: the combination of means for producing a voltage proportional to the residual chlorine content a short time after chlorination, means for producing a voltage proportional to the residual chlorine content a longer time after chlorination, a self-balancing potentiometer connected between the two above mentioned means for establishing the average difference, over a period of time, between the earlier residual and the later residual, and subtracting the voltage representing said average difference between the two readings from the first mentioned voltage representing the residual chlorine content a short time after chlorination, whereby to produce in a short time after chlorination a voltage approximately proportional to the residual chlorine content which would have been found present if the sample to which the first mentioned voltage refers had been retained for the longer period of time between chlorination and analysis, and means for employing the last mentioned voltage for manipulating the amount of chlorine fed into the water.

5. In an apparatus for controlling the amount of residual chlorine in water: the combination of means for producing a voltage proportional to the residual chlorine content, means for comparing this voltage with a voltage representing the desired control point to produce a voltage representing in magnitude and direction the deviation of the residual chlorine content from the control point, a capacitor connected so as to be charged in accordance with said deviation voltage, a twin triode having the grids thereof connected to said capacitor, a polarized relay connected to the anodes of said twin triode, and means connected to said relay for manipulating the chlorine fed into the water.

6. The method of determining and controlling the residual chlorine content of water: comprising the steps of producing a voltage proportional to the residual chlorine content of the water a short time after chlorination, producing a voltage proportional to the residual chlorine content a later time after chlorination, producing a voltage proportional to the average difference of the two aforementioned voltages over a long period of time, subtracting the last mentioned voltage from the first mentioned voltage to produce in a short time a voltage proportional to the residual chlorine content which would have been found if the water sample had been held for the longer period between chlorination and analysis, comparing this last mentioned voltage with a voltage representing the amount of residual chlorine content desired in the water, producing a voltage indicative in magnitude and direction of the deviation of the predicted residual chlorine content from the desired residual chlorine content, and employing this last mentioned voltage for manipulating the amount of chlorine fed into the water.

7. In an apparatus for controlling the amount of residual chlorine in water: the combination of photoelectric cell and electronic means for producing a voltage proportional to the residual chlorine content, electrical means for comparing this voltage with a voltage representing the desired control point to produce a voltage representing in magnitude and direction the deviation of the residual chlorine content from the control point, a capacitor connected so as to be charged in accordance with said deviation voltage, a twin triode, one of the grids of said twin triode being connected to one terminal of said capacitor and the other grid of said twin triode being connected to the other terminal of said capacitor, a polarized relay connected to the anodes of said twin triode, and means connected to said relay for manipulating the chlorine fed into the water.

8. In an apparatus for controlling the amount of residual chlorine in water: the combination of means for producing a voltage proportional to the residual chlorine content, means for comparing this voltage with a voltage representing the desired content point to produce a voltage representing in magnitude and direction the deviation of the residual chlorine content from the control point, said last mentioned means including a potentiometer, a capacitor connected to said potentiometer so as to be charged in accordance with said deviation voltage, a twin triode having the grids thereof connected to said capacitor, a polarized relay connected to the anodes of said twin triode, and means connected to said relay for manipulating the chlorine fed into the water.

9. In an apparatus for controlling the amount of residual chlorine in water: the combination of means for producing a voltage proportional to the residual chlorine content, means for comparing this voltage with a voltage representing the desired control point to produce a voltage representing a magnitude and direction the deviation of the residual chlorine content from the control point, said last mentioned means including a potentiometer, a calibrated dial attached to the slider of said potentiometer, said dial being calibrated in parts of chlorine per million parts of water corresponding to certain voltages on said potentiometer, a capacitor having one terminal connected to said potentiometer slider so as to be charged in accordance with said deviation voltage, a twin triode having the grid thereof connecting to said capacitor, a polarized relay connected to the anodes of said twin triode, and means connected to said relay for manipulating the chlorine fed into the water.

HERBERT A. STEIN.

REFERENCES CITED

The following references are of record in the file of this patent:

UNITED STATES PATENTS

| Number | Name | Date |
|---|---|---|
| 1,388,613 | Simsohn | Aug. 23, 1921 |
| 1,944,804 | Ornstein | Jan. 23, 1934 |
| 1,960,615 | Baker | May 29, 1934 |
| 2,076,964 | Pomeroy | Apr. 13, 1937 |
| 2,251,149 | Merckel | July 29, 1941 |
| 2,289,589 | Pomeroy | July 14, 1942 |
| 2,305,108 | Rowe | Dec. 15, 1942 |
| 2,350,378 | Wallace | June 6, 1944 |
| 2,396,934 | Wallace | Mar. 19, 1946 |

OTHER REFERENCES

Qualitative Chemical Analysis, by Vogel, pages 270-339, 1946.